United States Patent
Oleshchuk et al.

(10) Patent No.: US 7,611,090 B2
(45) Date of Patent: Nov. 3, 2009

(54) REACTION-DRIVE ROTORCRAFT HAVING AN ADJUSTABLE BLADE JET

(75) Inventors: Michael L. Oleshchuk, St. Charles, MO (US); Robert J. Bufe, Jr., Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 514 days.

(21) Appl. No.: 11/313,044

(22) Filed: Dec. 20, 2005

(65) Prior Publication Data
US 2008/0135677 A1 Jun. 12, 2008

(51) Int. Cl.
*B64C 15/00* (2006.01)
*B64C 27/22* (2006.01)

(52) U.S. Cl. ............... 244/12.5; 244/7 R; 244/12.1
(58) Field of Classification Search ........... 244/12.1, 244/12.5, 17.11, 7 R, 17.23
See application file for complete search history.

(56) References Cited

U.S. PATENT DOCUMENTS

| | | | | | |
|---|---|---|---|---|---|
| 3,015,363 | A | * | 1/1962 | Knecht | 416/20 R |
| 3,215,366 | A | * | 11/1965 | Stephens | 244/7 R |
| 3,327,969 | A | * | 6/1967 | Head | 244/7 R |
| 3,465,988 | A | * | 9/1969 | Orr | 244/12.1 |
| 5,454,530 | A | * | 10/1995 | Rutherford et al. | 244/7 A |
| 5,788,181 | A | * | 8/1998 | Wilson | 244/7 A |
| 6,109,565 | A | * | 8/2000 | King, Sr. | 244/207 |
| 6,885,917 | B2 | * | 4/2005 | Osder et al. | 701/3 |
| 7,412,825 | B2 | * | 8/2008 | Muylaert | 60/324 |

\* cited by examiner

*Primary Examiner*—Tien Dinh

(57) ABSTRACT

Rotorcraft including an airframe having a fuselage extending between a forward and an aft end and a powerplant producing high-pressure fluid. The rotorcraft includes a rotor assembly rotatably mounted on the airframe and having a plurality of rotor blades extending from a hub. Each rotor blade has a base, a tip, a leading edge extending between the base and tip, and a trailing edge extending between the base and tip opposite the leading edge. Each rotor blade has a jet adjacent its trailing edge in fluid communication with the powerplant by way of a fluid path. Each jet is adjustable between an open position in which the jet allows the high-pressure fluid from the power plant to pass through the jet and out of the rotor blade and a closed position in which the jet prevents the high-pressure fluid from passing through the jet and out of the rotor blade.

18 Claims, 4 Drawing Sheets

REACTION-DRIVE ROTORCRAFT HAVING AN ADJUSTABLE BLADE JET

BACKGROUND OF THE INVENTION

The present invention relates to rotorcraft and, more particularly, to reaction-drive rotorcraft having an adjustable rotor blade jet.

Referring to the drawings, FIG. 1 shows a rotor blade of conventional reaction-drive rotorcraft, generally designated by reference number 10. The blades 10 of reaction-drive rotorcraft are propelled by high-pressure gas exhausted from an orifice 12 positioned on a trailing edge 14 of the each blade. Reaction-driven rotor blades 10 include an outer skin 16 and internal structural components 18. The orifices 12 are openings in the outer skin 16 at the trailing edge 14 of the blade 10. The internal structural components 18 typically include a leading spar 20 located adjacent a leading edge 22 of the blade 10 and a trailing spar 24 located adjacent the trailing edge 14 of the blade. Because the orifice 12 is positioned at or very close to the trailing edge 14 of the blade 10, the trailing spar 24 can only extend continuously radially outward or outboard as far as the orifice 12.

Because the trailing spar 24 of conventional reaction-driven rotor blades 10 cannot extend continuously and uninterrupted outboard beyond the orifice 12, the orifice must be positioned sufficiently outboard so the trailing spar can extend radially outward enough to provide sufficient structural integrity for the blade. Many drawbacks relate to the limitations for orifice 12 positioning. A first drawback is a lack of design flexibility with respect to orifice 12 positioning. That is, the orifice 12 of conventional reaction-driven rotor blades 10 cannot be moved much farther inboard even when it is determined that moving it inboard would have many benefits because structural integrity of the blade would be compromised as a result of the shorter trailing spar 24. Another drawback of needing to have the orifice 12 far outboard is that ductwork 26 channeling the high-pressure gas to the orifice must extend farther, all the way along the blade to the orifice. This ductwork 26 extension requires additional material and increases weight. A further drawback is the blade 10 must be made thicker or otherwise larger adjacent a blade tip 28 to accommodate the orifice 12 and increased ductwork 26. The larger blade 10 adds weight, which is generally undesirable in blade design, especially farther outboard on the blade where centrifugal forces are higher during rotor operation.

The orifices 12 of conventional rotorcraft also have a constant opening 30 size. Thus, high-pressure gas passing to and through the rotor blade 10 of conventional rotorcraft will exhaust from the orifices 12 at a generally constant mass flow. Although constant mass flow is desirable at times during rotorcraft operation, the constant-sized orifices 12 do not allow changes to mass flow, which would be very beneficial at other times.

BRIEF SUMMARY OF THE INVENTION

The present invention relates to rotorcraft including an airframe having a fuselage extending between a forward end and an aft end. The rotorcraft further includes a power plant mounted on the airframe producing high-pressure fluid during operation of the rotorcraft. The rotorcraft also includes a rotor assembly rotatably mounted on the airframe and having a plurality of rotor blades extending outward from a central hub. Each rotor blade has a base adjacent the hub, a tip opposite the base, a leading edge extending between the base and the tip, and a trailing edge extending between the base and the tip opposite the leading edge. Each rotor blade also has a jet adjacent its trailing edge that is in fluid communication with the power plant by way of a fluid path. Each jet is adjustable between an open position in which the jet allows the high-pressure fluid from the power plant to pass through the jet and out of the rotor blade and a closed position in which the jet prevents the high-pressure fluid from passing through the jet and out of the rotor blade.

In another aspect, the present invention relates to a method of flying a rotorcraft having a fuselage, a power plant mounted on the fuselage, and a rotor assembly rotatably mounted on the fuselage and including a plurality of rotor blades extending radially outward from a central hub. Each blade includes a jet in fluid communication with the power plant. The method includes producing high-pressure fluid using the power plant and selectively rotating the rotor by directing the high-pressure fluid from the power plant to the rotor blades and out of the rotor blades by way of the jets. The method further includes controlling an amount of high-pressure fluid directed out of each jet by selectively adjusting a size of an opening of the jet.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 2:
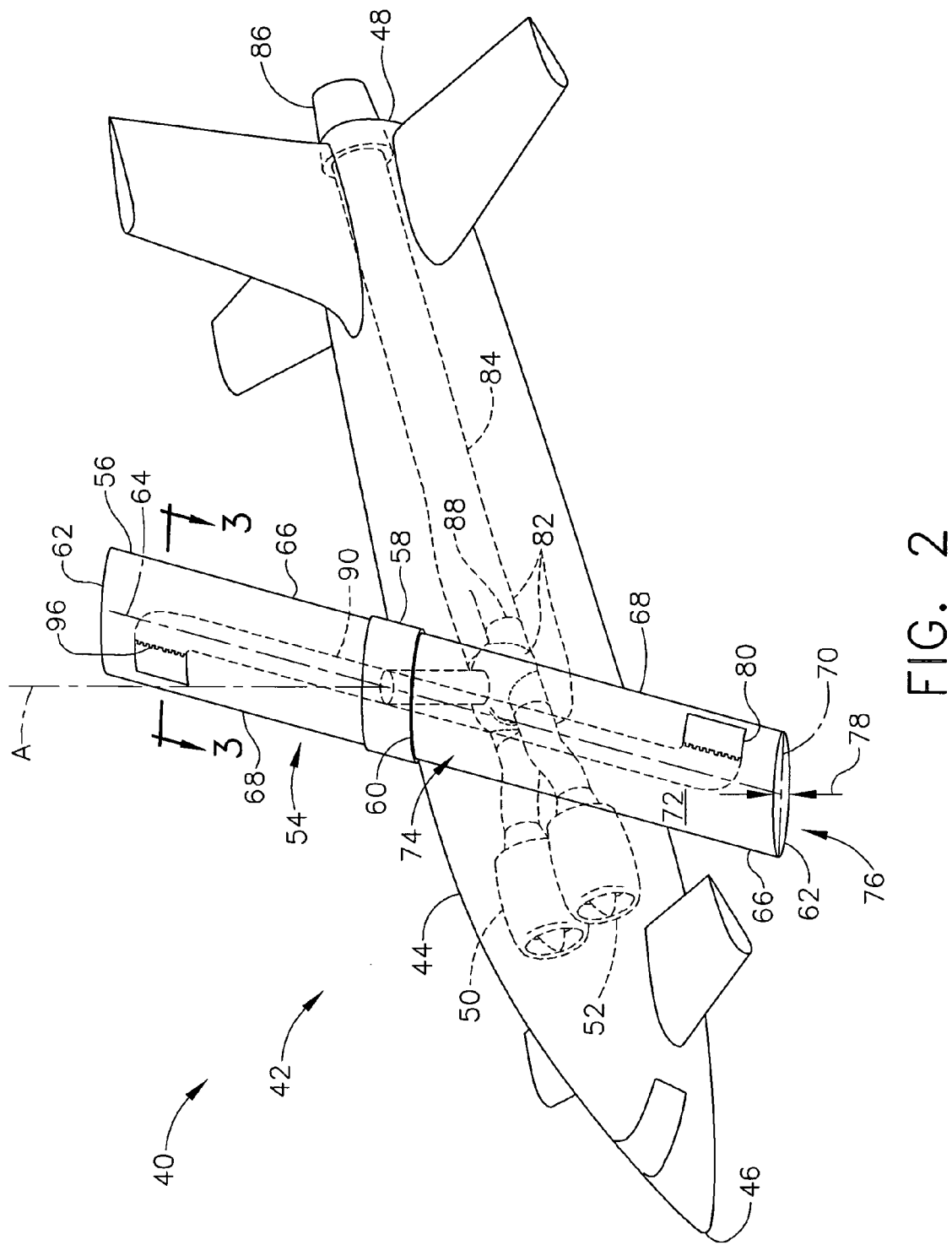
FIG. 2 is a perspective of rotorcraft according to the present invention.

Referring to the drawings, and more particularly to FIG. 2, rotorcraft according to the present invention is designated in its entirety by reference number 40. Although a canard rotor/wing rotorcraft 40 is shown, the present invention may include other types of aircraft, such as helicopters. The rotorcraft 40 includes an airframe 42 having a fuselage 44 extending between a forward end 46 and an aft end 48 and one or more power plants 50, 52 mounted on the airframe. The power plants 50, 52 produce high-pressure fluid, such as high-pressure gas, during operation of the rotorcraft. Although the power plants 50, 52 may be other types without departing from the scope of the present invention, in one embodiment each power plant is an Adour Mk951, which is a turbofan engine jointly developed by Rolls-Royce International Limited, of London, England, and Turbomeca, of France. The rotorcraft 40 also includes a rotor assembly 54 that is rotatably mounted on the airframe 42. Although the rotorcraft 40 is shown having a single rotor 54, the rotorcraft may have multiple rotor assemblies rotatably mounted on the airframe 42 and operated according to the present invention. The rotor 54 includes a plurality of rotor blades 56 extending outward from a central hub 58. Although the rotor 54 may have other numbers of blades 56 without departing from the scope of the present invention, in one embodiment the rotor has two blades. The rotor blades 56 and hub 58 rotate about a central axis "A" of the rotor 54 during operation of the rotor.

Each blade 56 includes a base 60 adjacent the hub 58 and a tip 62 opposite the base. A blade span 64 extends between the base 60 and the tip 62 and generally bisects the blade 56. Although each span 64 may have other lengths without departing from the scope of the present invention, in one embodiment each span has a length of between about 20 feet and about 25 feet. In one particular embodiment, each span 64 has a length of about 23 feet. Each rotor blade 56 further includes a leading edge 66 extending between the base 60 and the tip 62 and a trailing edge 68 extending between the base and the tip opposite the leading edge. A blade chord 70 extends between the leading edge 66 and the trailing edge 68. Although each chord 70 may have other lengths without departing from the scope of the present invention, in one embodiment each chord has a length of between about 5 feet and about 8 feet. In one particular embodiment, each chord 70 has a length of about 6.5 feet. Each rotor blade 56 also includes an outer skin 72 surrounding the blade. The outer skin 72 forms a top 74 of the blade and a bottom 76 of the blade opposite the top. Although each blade 56 may have other maximum thicknesses 78 between the top 74 and the bottom 76 without departing from the scope of the present invention, in one embodiment each blade has a maximum thickness of between about 17 inches and about 21 inches adjacent the blade base 60 and a maximum thickness of between about 7 inches and about 11 inches adjacent the blade tip 62. In one particular embodiment, each blade 56 has a maximum thickness 78 of about 19 inches adjacent the blade base 60 and a maximum thickness of about 9 inches adjacent the blade tip 62.

Each rotor blade 56 has a jet 80 adjacent its trailing edge 68 in fluid communication with the power plants 50, 52 by way of a fluid path 82. The fluid path 82 may include an aft portion 84 leading to a tail nozzle 86 adjacent the aft end 48 of the rotorcraft and a flight control valve 88 for selectively directing high-pressure fluid from the power plants 50, 52 toward the rotor 54 for vertical flight and/or toward the tail nozzle for forward flight. The rotorcraft 40 has a rotation mode wherein the rotor 54 is rotated by high-pressure fluid directed from the power plants 50, 52 to the rotor and a fixed mode wherein the rotor is stopped and locked to prevent rotor rotation and the high-pressure fluid is exhausted from the tail nozzle 86. Because the rotorcraft 40 can operate in a rotation mode and in a fixed mode, the rotorcraft 40 is said to be a dual-mode aircraft. In the rotation mode, the rotor 54 provides vertical thrust to the rotorcraft 40 as the rotor rotates. In the fixed mode, the rotor 54 acts as a wing and provides lift to the rotorcraft 40 during forward flight. For this reason, the rotor blades 56 can also be referred to as rotor/wings. Because each blade edge 66, 68 may end up facing forward when the rotor 54 is stopped for fixed mode flight, the leading edge and trailing edge are generally shaped the same. For example, in one embodiment the leading edge 66 and trailing edge 68 are bluntly shaped, as shown in FIGS. 4A and 4B. The rotor blade is shaped to optimize aerodynamic performance in the rotation mode and in the fixed mode. The rotorcraft 40 also has intermediate modes between the rotation mode and the fixed mode. For example, the rotorcraft 40 flies in directions between forward and vertical when the rotorcraft 40 is transitioning from the rotation mode to the fixed mode or from the fixed mode to the rotation mode.

Each blade 56 further includes internal ductwork 90 connecting the fluid path 82 and the jet 80 of that blade. The rotor 54 is rotated when the high-pressure fluid produced by the power plants 50, 52 is directed through the fluid path 82 and ductwork 90 and exhausted out of the jets 80. In reaction to the high-pressure fluid being exhausted from the jets 80, the rotor 54 rotates thereby providing vertical thrust to the aircraft. For this reason, the rotor 54 is said to be reaction-driven.

Figure 3A:
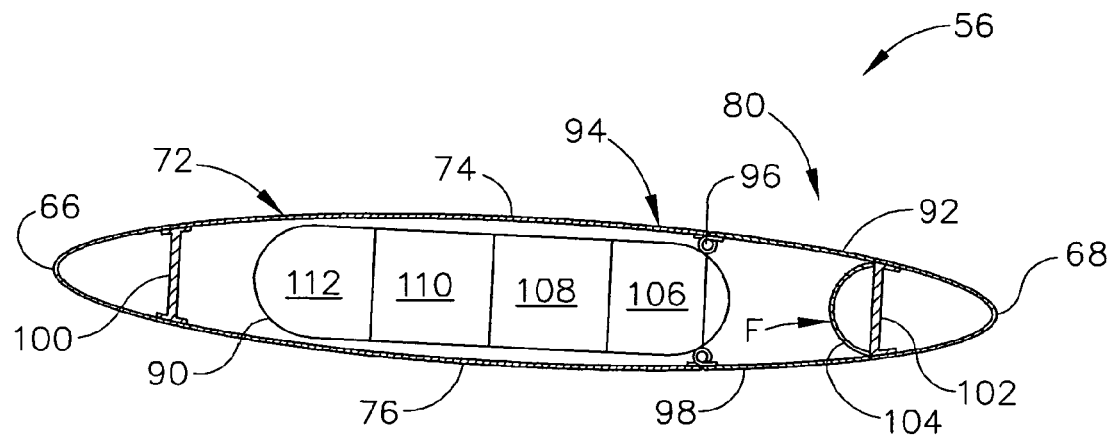
FIG. 3A is a cross section of a blade of the rotorcraft according to the present invention taken along lines 3-3 of FIG. 2 shown with an adjustable jet in a closed position.
Figure 3B:
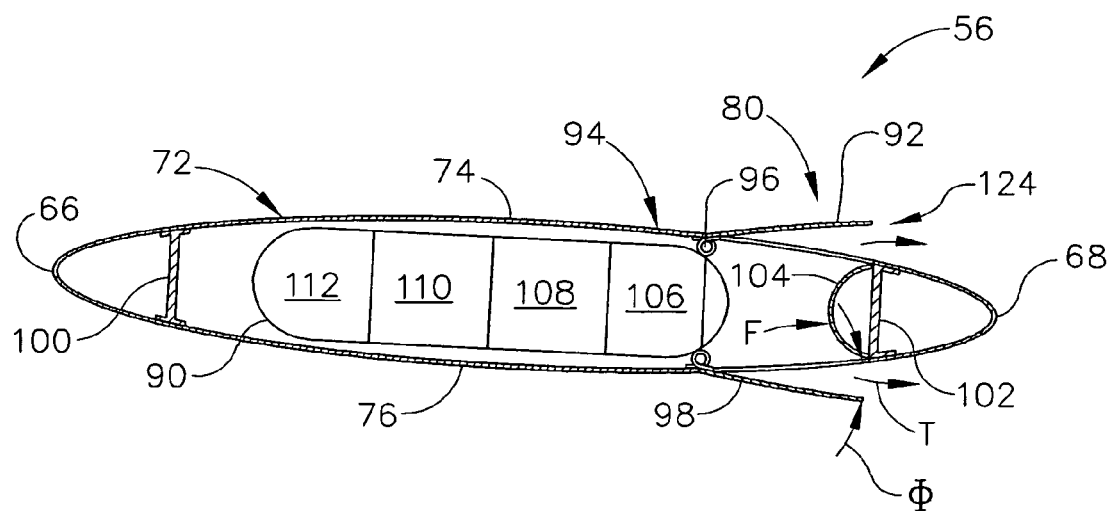
FIG. 3B is a cross section of the rotorcraft blade according to the present invention taken along lines 3-3 of FIG. 2 shown with the adjustable jet in an open position.

As shown in FIGS. 3A and 3B, each jet 80 includes a movable cover 92. The movable cover 92 is moved to adjust the jet 80. The cover 92 is movable between an open position, allowing a maximum mass of the high-pressure fluid to pass through the jet and out of the rotor blade 56, and a closed position, preventing the high-pressure fluid from passing through the jet and out of the rotor blade. FIG. 3A shows the cover 92 in the closed position and FIG. 3B shows the jet in the open position. The cover 92 may also be adjusted to intermediate positions between the open position and the closed position allowing the high-pressure fluid to exit the blade 56 in a volume proportionate to an amount the cover is open.

The movable cover 92 may include a door pivotally connected to a remainder 94 of the outer skin by way of one or more hinges 96. It is contemplated that the movable cover 92 may be movably connected to the remainder 94 of the skin 72 in other ways. For example, in one embodiment (not shown), the movable cover 92 is slidably connected to the remainder of the skin 72 so the movable cover can be slid into and out of a pocket in the blade 56 to adjust the jet between the open, closed, and intermediate positions. The movable cover 92 may be connected to the top 74 or the bottom 76 of the blade 56. In one embodiment, the blade 52 includes at least two movable covers 92, 98 of the outer skin 72. In one embodiment, the covers 92, 98 are both doors pivotally connected to the remainder 94 of the outer skin 72 of the blade 56. Although the covers 92, 98 may open to other maximum angles $\phi$ without departing from the scope of the present invention, in one embodiment the maximum open angle for each cover is between about 10° and about 20°. The covers 92, 98 may be actuated open and closed in a variety of ways. For example, the hinges 96 may be powered by an electric motor (not shown) to open and close the covers 92, 98 or by other actuators (not shown), as will be apparent to those skilled in the art. For embodiments having multiple covers 92, 98, the covers can be controlled to move together in unison and to move separately.

In a span-wise direction of the blade 56, each jet 80 is positioned between the blade tip 62 and about mid-span 64. Although the jet 80 may have other span-wise positions without departing from the scope of the present invention, in one embodiment each jet is positioned between about 75% and about 95% of the span 64 from the base 60. In a chord-wise direction of the blade 56, each jet 80 is positioned between about mid-chord 70 and the trailing edge 68 of the blade 56. Each blade 56 may include one or more internal spars 100, 102 extending between the base 60 and the tip 62 for providing structural integrity to the blade. In one embodiment, the spars include a leading spar 100 extending within the blade 56 adjacent the leading edge 66 of the blade and a trailing spar 102 extending within the blade adjacent the trailing edge 68 of the blade. The jet 80 may be positioned between about mid-chord 70 and the trailing spar 102 in the chord-wise direction of the blade 56. Each blade 56 may also include a diverter 104 adjacent and in front of the trailing spar 102 to direct high-pressure fluid to flow over the trailing spar, past the doors 92, 98, and out of the blade. In one embodiment, the diverter 104 is directly connected to the trailing spar 102. The diverter 104 has a cross-sectional shape that causes fluid moving toward it to be diverted over and/or under the diverter and the trailing spar 102 and out of the jet 80. For example, the diverter 104 may include a convex face "F", as shown in FIGS. 3A and 3B.

Figure 1:
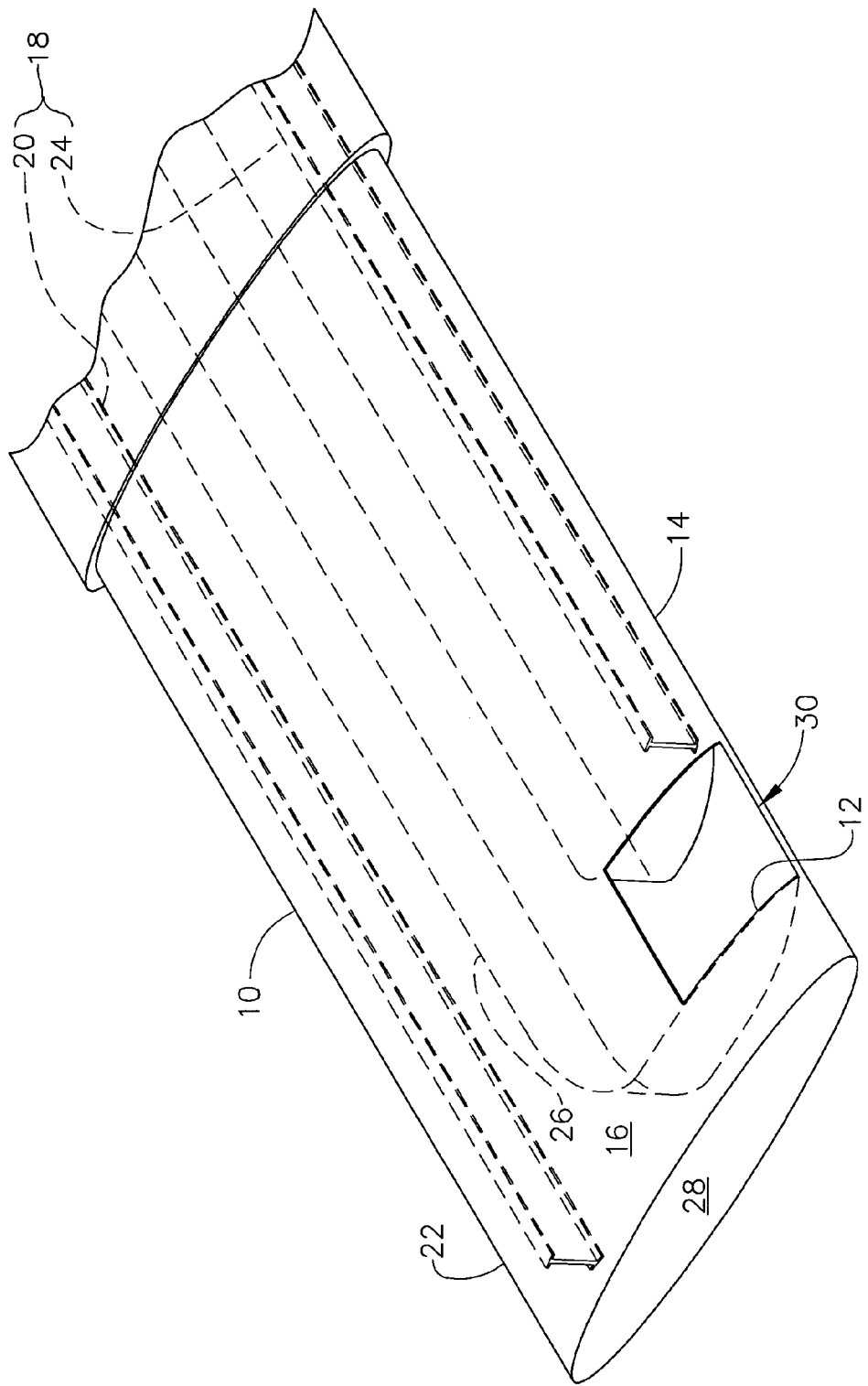
FIG. 1 is perspective of a rotor blade of a conventional reaction-drive rotorcraft.

Positioning the jet 80 in front of the trailing spar 102 allows the trailing spar to extend continuously radially outward or outboard from the blade hub 58 beyond the jet. Because the trailing spar 102 can extend outward beyond the jet 80, the jet can be positioned further inboard. As shown in FIG. 1 and described in the Background of the Invention section, because the trailing spar 26 of conventional reaction-driven rotors cannot extend radially outward beyond the blade orifice 14, the orifice must be positioned more outboard so the trailing spar can extend farther outboard in order to provide needed structural support for the blade 10. On the other hand, because the trailing spar 102 can extend uninterrupted radially outward beyond the jet 80 as far as the blade tip 62 in the present invention, jet positioning is much less dependent on the structural requirements of the blade 56 and can be moved farther inboard as a result.

One design benefit of an increased flexibility in jet 80 positioning is that moving the jet inboard reduces Coriolis torque effects. Coriolis torque is the reaction force resulting from the acceleration that must be imparted to the high-pressure fluid from the power plants 50, 52 as it flows through the blade 56. That is, as the high-pressure fluid moves through the ductwork 90 from the blade base 60 to the jet 80, the blade 56 must accelerate the fluid in the circumferential direction because the blade is moving faster circumferentially at points more outward. Positioning the jet 80 farther inboard reduces the distance the fluid must travel from the blade base 60 before it is exhausted from the jet and thus reduces the amount of increase in circumferentially acceleration that must be imparted to the fluid, thereby reducing the Coriolis torque effects. Further, because Coriolis torque reduces the amount of net torque produced by the high-pressure fluid exhausting from the blade 56, a reduction in Coriolis effects results in a higher blade net thrust torque or a decrease in the amount of power needed to produce the same amount of blade thrust. The reduced Coriolis effects may result in higher blade 56 thrust and lower power requirements.

Another benefit of the increased flexibility in jet 80 positioning is blade weight reduction. When the jet 80 is positioned farther inboard on the blade 56, less internal ductwork 90 is required to direct the high-pressure fluid from the fluid path 82 to the jet. Further, the blade 56 can be thinner or otherwise smaller between the tip 62 and the jet 80 than would be possible if the jet were farther outboard because a larger blade would be needed to accommodate the structural requirements of additional ductwork 90 farther outboard. The smaller blade 56 further decreases blade weight. As will be apparent to those skilled in the art, blade 56 weight reductions closer to the blade tip 62 are especially beneficial to rotor design due to the higher centrifugal forces that exist farther outboard on the blade during operation. For example, a small decrease in blade tip 62 weight can result in the ability to decrease blade 56 structure and thus weight by many multiples closer to the base 60 without compromising blade 56 integrity.

Although positioning the jet 80 farther inboard on the blade 56 has many benefits, more inward jet 80 positioning must be balanced with the affects that moving the jet inboard will have on power-to-thrust characteristics of the rotor. The amount of blade 56 thrust torque caused by the high-pressure fluid exhausted from the blade is generally equal to the reaction force caused by the fluid exiting the blade multiplied by the moment arm of the jet 80 (i.e., the radial distance from the central axis "A" of the rotor 54 to the jet). Moving the jet 80 will result in a shorter moment arm and, thus, a proportionately lower blade 56 thrust torque. In one embodiment of the present invention, it was found that the structural and performance benefits outweigh negative power-to-thrust effects resulting from shortening the moment arm when the jet 80 is moved inboard to a position of between about 95% and about 75% of the span 64 from the blade base 60. In that embodiment, it was found that moving the jet 80 farther inboard than about 75% results in diminished overall system performance, including power requirements.

Figure 4:
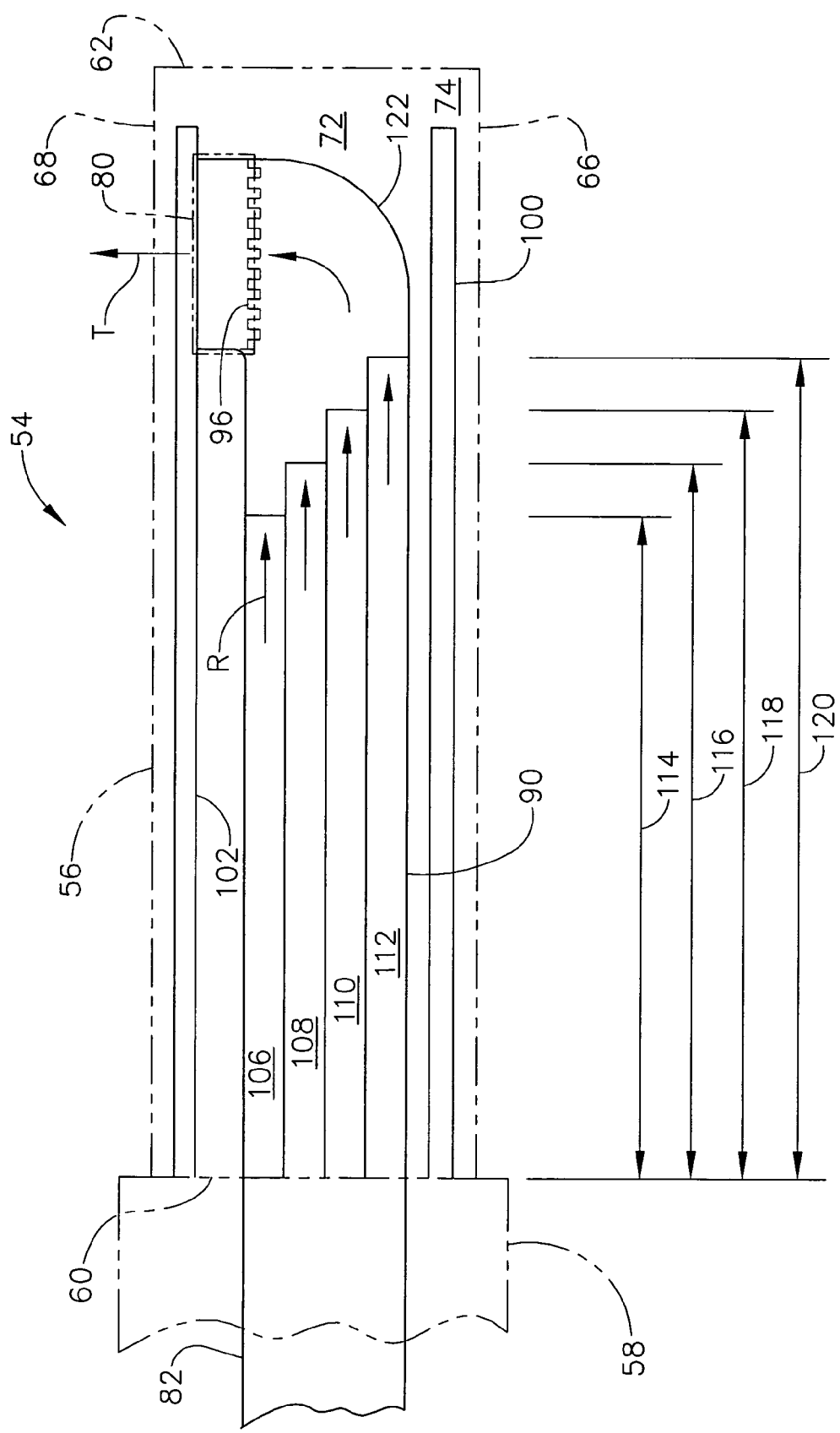
FIG. 4 is a top view of the rotorcraft blade according to the present invention.

As shown in FIG. 4, the blade 56 ductwork 90 may include a plurality of separate ducts 106, 108, 110, 112. The ducts 106, 108, 110, 112 may have various cross-sectional shapes without departing from the scope of the present invention. For example, in one embodiment each duct 106, 108, 110, 112 has a generally circular cross-sectional shape (not shown in detail). Each duct 106, 108, 110, 112 has a length 114, 116, 118, 120 and, in one embodiment, each duct has a length that is different from the length of the other ducts. For example, the ducts 106, 108, 110, 112 closer to the leading edge 66 of the blade 56 may be longer than those closer to the trailing edge 68 of the blade. This cascading or tapered duct 106, 108, 110, 112 layout facilitates fluid dynamics within the ductwork 90 in an elbow 122 of the ductwork where the fluid changes directions from radially outward (as indicated by arrow "R") and circumferentially forward (due to the forward rotation of the blade with the fluid in it) during rotor 54 rotation to primarily tangentially rearward (indicated by arrow "T") for exhaustion from the blade 56.

The power plants 50, 52, the flight control valve 88, and the rotor 54 including the jets 80 are selectively controlled during rotorcraft 40 operation to accomplish various types of flight. The power plants 50, 52 produce the high-pressure fluid with which the rotor 54 is reaction-driven for providing vertical thrust and/or that is exhausted from the tail nozzle 86 for providing forward thrust. The flight control valve 88 is controlled to direct the high-pressure fluid from the power plants 50, 52 to the rotor 54 and/or tail nozzle 86 in desired amounts. For forward flight, the rotor 54 is stopped and locked so the blades 56 extend laterally from the airframe 42 and act as wings and the flight control valve 88 directs the fluid to exhaust from the tail nozzle 86.

When the jets 80 are in the open position or in an intermediate position, the high-pressure fluid from the power plants 50, 52 is directed through the ductwork 90, to the jets, over the respective diverter 104, and out of the open jet. The fluid exhausted from the jets 80 results in a reaction force being applied to the blades 56 thereby propelling the blades to rotate about the central axis "A". The rotating rotor 54 provides vertical thrust for the rotorcraft 40.

The mass flow rate of high-pressure fluid exhausting through each jet 80 is controlled by controlling a size of an opening 124 of the jet (shown in FIG. 3B). In one embodiment, controlling the size of the jet 80 opening 124 includes controlling an amount that the jet door or cover 92, 98 is opened or closed. It is contemplated that the amount of fluid exhausted from the jet 80 can also be controlled by the flight control valve 88 and/or other regulating devices (not shown) positioned in fluid communication with and between the power plants 50, 52 and the jets 80. For example, although a cover 92, 98 may be in its open position, less than the full mass flow of high-pressure fluid could be exhausting through the jet 80 if less fluid is being channeled through the flight control valve 88 to the rotor 54. The cover 92, 98 can be moved so various amounts of high-pressure fluid are directed out of the blade 56. For embodiments having multiple covers 92, 98 per jet 80, the covers can be moved together or independently. That is, one of the covers 92, 98 can be static while the other 98, 92 is moved or the covers can be moved in the same direction at the same time and at the same speed (i.e., together in unison), in the same direction at different speeds, or in opposite directions at the same or different speeds. When various covers 92, 98 of a multi-door jet 80 are opened to different amounts, different amounts of high-pressure fluid exhausts from the blade 56.

In addition to affecting blade 56 thrust, controlling the amount of fluid passing through the jets 80 can also affect blade pitch and/or aerodynamic conditions adjacent the blade. For example, directing a different amount of fluid from a top door 92 and a bottom door 98 of a jet 80 creates a pressure differential or changes a preexisting differential about the blade 56. Controlling pressure differentials about the blade 56 can cause the blade to pitch in various ways. For example, the blade 56 can pitch by twisting about the span 64, twisting about the chord 70, bending upward, and/or bending downward. The user can thus change the aerodynamic performance of the blade, by controlling the amount of fluid exhausted from each jet door 92, 98. A pressure balance or differential can also directly affect the aerodynamic conditions adjacent the blade 56. For example, fluid exhaustion can be controlled to decrease the separation of airflow adjacent the blade 56. As ambient air flows in a boundary layer over and adjacent the blade 56, forces are imparted to the blade when the air separates from the blade, which often primarily occurs adjacent the trailing edge 68 of the blade. Air flows adjacent the blade 56 due at least in part to Coanda Effects. Coanda Effect is the tendency for a stream of fluid moving adjacent a convex surface to stay attached to that surface. An open jet door 92, 98 and high-pressure fluid exhausting past that door can reduce the forces associated with separated flow by decreasing the amount of separation by changing the shape of the boundary layer, especially adjacent the trailing edge 68 of the blade 56. Further, the amount and nature of the lift produced by a blade 56 can be controlled by selectively adjusting the jet 80. In this way, the jets 80 can affect aerodynamics in a manner similar to that of conventional aircraft flaps.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A rotorcraft comprising:
an airframe;
a power plant mounted on the airframe for producing high-pressure fluid during operation of the rotorcraft; and
a rotor assembly rotatably mounted on the airframe and including a plurality of reaction-driven rotor blade, each rotor blade including:
a trailing spar adjacent a trailing edge; and
a jet located in front of the trailing spar, the jet in fluid communication with said power plant, the jet including:
a diverter carried within the blade, for directing high-pressure fluid from the power plant to pass past the trailing spar and through orifices in the blade; and
movable covers for the orifices, the covers moved to adjust the flow of the high-pressure fluid through the orifices and out of the rotor blade wherein for each blade, the trailing spar extends outboard of the jet.

2. The rotorcraft as set forth in claim 1 wherein each jet is positioned between about mid-chord and said trailing edge of its corresponding rotor blade.

3. The rotorcraft as set forth in claim 1 wherein each jet is positioned between about 75% and about 95% of its corresponding blade's span.

4. The rotorcraft as set forth in claim 1 wherein
each trailing spar extends continuously radially outward and beyond its corresponding jet.

5. The rotorcraft as set forth in claim 1 wherein each rotor blade includes internal ductwork for providing a fluid path from its jet to the propulsion engine, said ductwork including a plurality of ducts.

6. The rotorcraft as set forth in claim 5 wherein each duct has a length that is different from the length of the other ducts.

7. The rotorcraft as set forth in claim 1 wherein said movable covers are pivotally connected to outer skin of their respective rotor blade and movable between an open position and a closed position.

8. The rotorcraft as set forth in claim 7 wherein each cover is movable to an intermediate position between said open position and said closed position allowing said high-pressure fluid to exit the blade in a volume proportionate to an amount the cover is opened.

9. The rotorcraft as set forth in claim 7 wherein said covers include an upper cover pivotally connected to a top of each rotor blade and a lower cover pivotally connected to a bottom of each rotor blade.

10. The rotorcraft as set forth in claim 7 wherein said covers of each blade can be moved together and independently.

11. The rotorcraft as set forth in claim 1 wherein the rotorcraft has a rotation mode wherein the rotor assembly is rotated by the power plant and a fixed mode wherein the rotor assembly is locked to prevent rotor rotation.

12. A method of flying the rotorcraft of claim 1, the method comprising:
producing high-pressure fluid using said power plant;
selectively rotating the rotor assembly by directing said high-pressure fluid from said power plant to said rotor blades and out of said rotor blades by way of said jets; and
controlling an amount of high-pressure fluid directed out of each jet by moving the covers to adjust sizes of the orifices.

13. A method as set forth in claim 12 wherein the rotor assembly is rotated during a rotation mode of the rotorcraft and the method further comprises locking the rotor assembly to prevent rotor assembly rotation during a fixed mode of the rotorcraft.

14. A method as set forth in claim 12 wherein said controlling step includes selectively opening and closing a cover.

15. A method as set forth in claim 12 wherein said controlling step includes selectively opening and closing at least two covers.

16. A method as set forth in claim 15 wherein said controlling step includes opening and closing said covers by different amounts so various amounts of high-pressure fluid is directed out of the blade.

17. A method as set forth in claim 15 further comprising controlling rotor blade pitch by exhausting a different amount of high-pressure fluid by way of each cover.

18. A method as set forth in claim 15 further comprising controlling aerodynamic conditions adjacent each blade by exhausting a different amount of high-pressure fluid by way of each cover.

* * * * *

UNITED STATES PATENT AND TRADEMARK OFFICE
CERTIFICATE OF CORRECTION

| | | |
|---|---|---|
| PATENT NO. | : 7,611,090 B2 | Page 1 of 1 |
| APPLICATION NO. | : 11/313044 | |
| DATED | : November 3, 2009 | |
| INVENTOR(S) | : Oleshchuk et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this

Twelfth Day of October, 2010

David J. Kappos
*Director of the United States Patent and Trademark Office*